United States Patent Office 3,548,171
Patented Dec. 15, 1970

3,548,171
FURNACE CONTROL METHOD AND APPARATUS
Witold T. Kodz, London, England, assignor to The British
Iron and Steel Research Association
Filed June 22, 1966, Ser. No. 559,696
Claims priority, application Great Britain, June 15, 1965,
25,242/65
Int. Cl. C21d *1/34;* G06f *7/38;* G06g *7/40*
U.S. Cl. 235—151.1                                    15 Claims

ABSTRACT OF THE DISCLOSURE

A control of furnaces and more particularly the automatic control of slab reheating furnaces is provided which automatically controls the furnace both to heat slabs to a minimum temperature equal to the desired article exit temperature and to operate at a minimum fuel consumption rate.

---

This invention relates to the control of furnaces and more particularly to the automatic control of so-called continuous furnaces through which articles of varying dimensions are passed at variable speed. The invention has in fact been developed primarily in relation to continuous slab reheating furnaces employed for heating metal slabs in association with a hot rolling mill for subsequent processing of the heated slabs to strip, plate or other forms. Accordingly, it is convenient to describe the invention by way of example with reference to slab furnaces.

Various proposals have been made for automatic control of hot rolling mills and it is clearly desirable that similar control be made available for associated continuous reheating furnaces. Thus, matching of the furnace performance to that of the mill would permit accurate and comprehensive scheduling of operations. Ideally, the furnace control should take account of mill stoppages, while it should reduce such stoppages which may otherwise arise from presentation to the mill of slabs having widely varying temperatures. Again: if a presented slab is too cold, it will at least slow down the mill operation; while if a slab is too hot it can lead to loss of material through excess scale formation, or scrapping of the slab if melting occurs.

Generally, the view can be taken that a form of appropriate furnace control will stem directly from the basic requirement to reduce to a minimum the variation of actual slab exit temperature from a desired value and this view leads, in turn, to a control system based on a method of at least squares or the like relative to slab exit temperature errors. However, while such control systems are possible, they will be associated with considerable complexity of control apparatus principally in the form of a digital computer requiring large data storage facilities.

According to the present invention in one aspect there is proposed a method of controlling a continuous slab reheating furnace which comprises automatically controlling the furnace both to heat slabs to a minimum temperature equal to the desired article exit temperature and to operate at a minimum fuel consumption rate.

In other words the control of the invention operates on the basis of two requirements, namely, that actual exit temperatures are greater than or equal to the desired value, and that fuel consumption is minimised. The second requirement constrains attainment of the first towards the equality rather than the inequality, while the second requirement itself is an additional advantage in operation which is not necessarily achieved by other modes of control.

According to the present invention in another aspect, it is preferred to employ a control method of a sequential predictive nature operating to control slab temperatures to predetermined minimum values at intermediate points of the slabs' path through the furnace, the points defining successive furnace sections respectively associated with the successive predictive control steps, while at the same time the furnace is controlled for minimum fuel consumption.

Conveniently, the furnace sections for this purpose correspond to the physical zones of a conventional slab reheating furnace, which zones are termed the preheat, tonnage and soaking zones. Also, it is preferred that measurement be made of the actual slab temperatures at the intermediate points in question, whereby successive control steps are effected in response to the actual results of the respectively preceding control operations rather than results predicted therefor.

Advantage can be taken of the fact that the instrumentation of a slab furnace is normally such that the furnace zone temperatures, as distinct from the slab temperatures attained in the zones, can be readily set by use of conventional control equipment. Then in producing a mathematical model of the furnace process for the purpose of control in accordance with the invention it is preferred to take account of furnace zone temperatures as control or manipulated variables, and in addition to take account of the rate of material bulk movement and the slab tonnage rate as disturbance variables.

In order that the present invention may be clearly understood the same will now be more fully described, by way of example, with reference to the accompanying drawings, in which.

Figure 1:
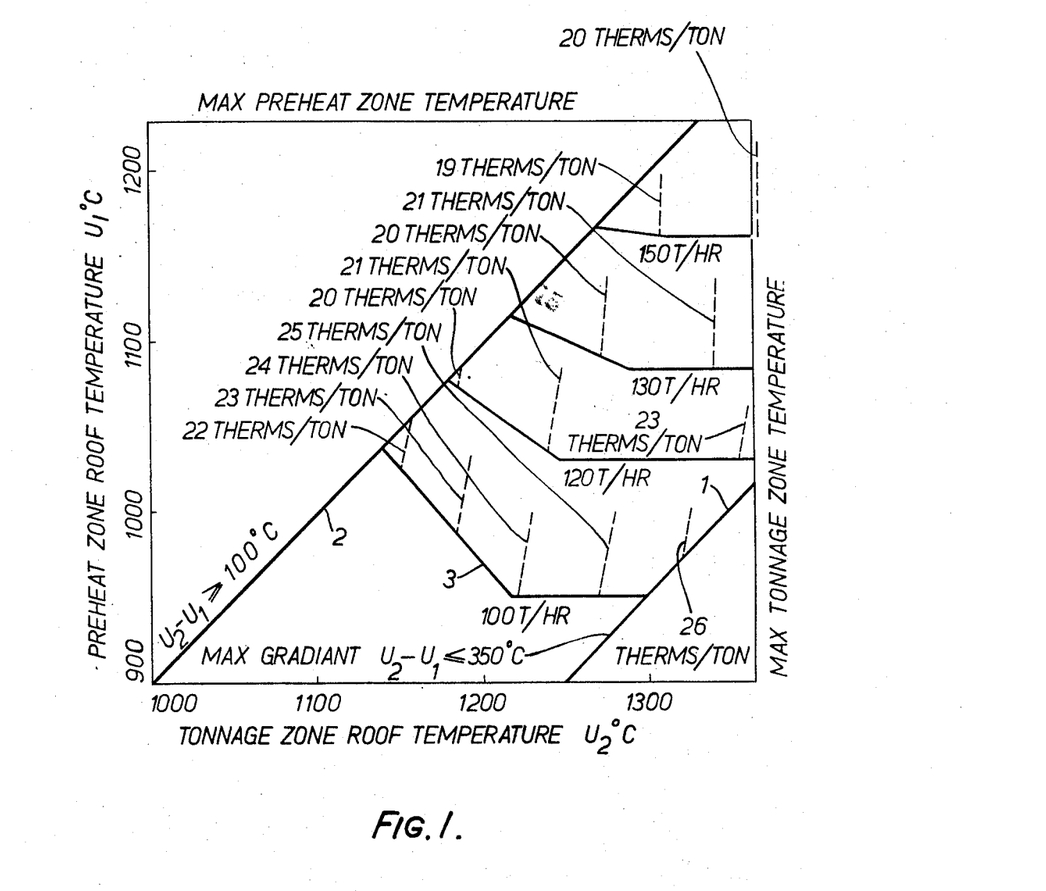
FIG. 1 is a two-dimensional representation of one control mode according to the invention.

For the control mode associated with FIG. 1 it is assumed that the furnace temperature can be taken as constant in each furnace zone and it is such zone temperatures through which control is effected, that is to say, the zone temperatures are the control variables. Also, it is assumed that suitable heat transfer coefficients can be derived to account for temperature changes in the slabs through the furnace zones at a variable velocity.

In accordance with the earlier noted preference, the disturbance variables which effectively give rise to the need for control such as that under discussion are taken as being the slab velocity, the slab thickness and the slab tonnage rate. Also, the control mode is such that the slab exit temperatures from the furnace zones namely, the product variables, are at least equal to predetermined values. Lastly, the operation is associated with three intermediate variables, namely, the furnace temperature gradient, the temperature gradient in slabs, and the furnace fuel consumption; and the control mode is to be such that the latter is minimised.

Then, a mathematical model of the furnace process is produced as a basis for the control mode, which model comprises a set of constraints, one for each furnace zone and relating the variables relevant thereto, together with an additional equation representing fuel consumption.

FIG. 1 represents the simple case where only two control variables $U_1$ and $U_2$, the preheat and tonnage zone temperatures, are employed so that a two-dimensional graph is obtained. Boundary lines 1 and 2 for maximum and minimum furnace temperature gradients are chosen, as shown, so that the slabs are heated to at least 600° C. in the preheat zone and at least 1100° C. in the tonnage zone, and at the same time account is taken of maximum zone temperatures for practical reasons to protect the furnace roof.

Then it will be seen that for given values of disturbance variables, a possible control region, such as that defined by line 3, is defined and the fuel consumption varies within each such region towards a minimum adjacent the minimum furnace temperature gradient boundary. Also, it will be noted that the possible control zones become larger as the tonnage rate becomes smaller; that is to say, there is greater scope for control when the furnace is being operated at low efficiency as regards slab throughput, and this is particularly advantageous since it is the situation most requiring flexible control.

Figure 2:
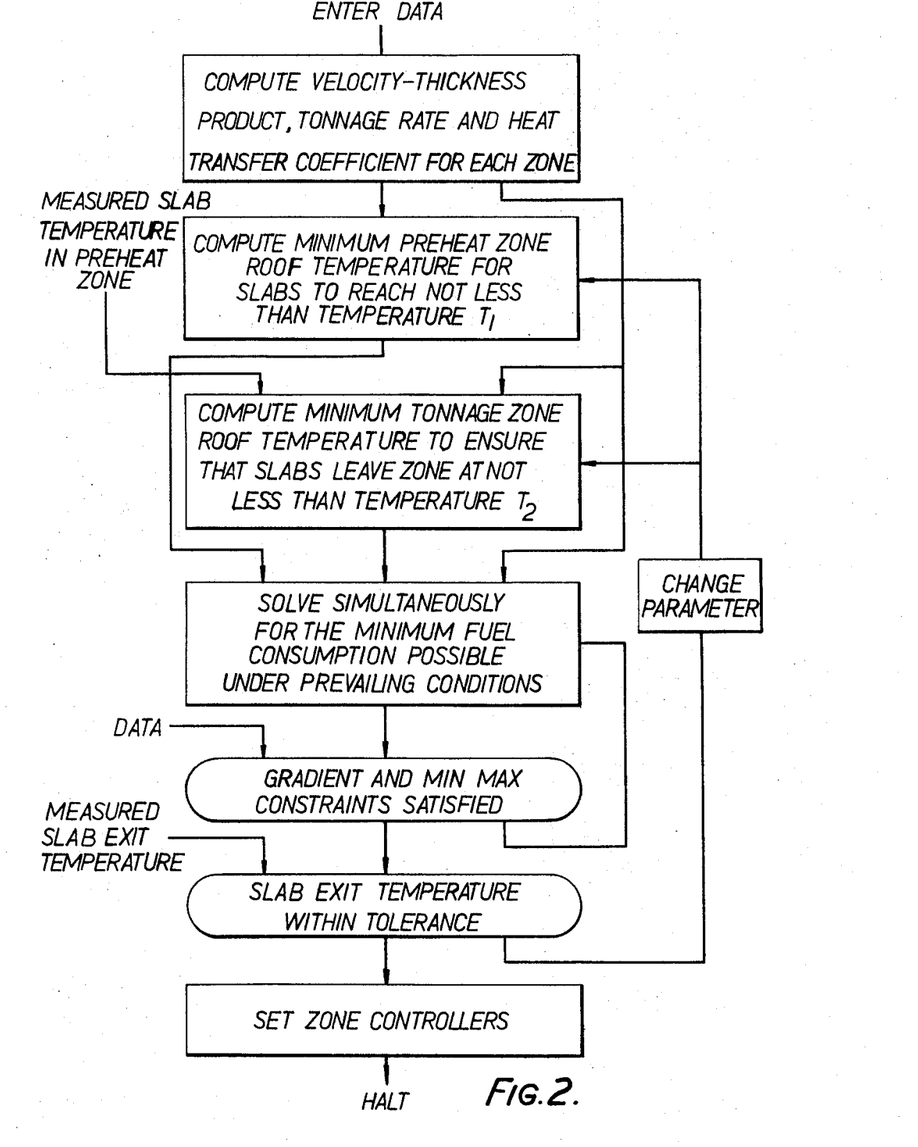
FIG. 2 is a flow diagram representing the general form of computations associated with the control mode of FIG. 1.

FIG. 2 illustrates the various computations associated with a control mode such as that of FIG. 1 and these operate on the aforementioned disturbance and manipulated variables in accordance with predetermined relationships to predict what values of zone temperatures should be employed to meet the minimum slab zone exist temperature constraints. This solution of the constraint relationships is effected simultaneously with attainment of minimum fuel consumption in accordance with another predetermined relationship.

Preferably, measurement is made of the actual slab exit temperatures from the preheat and tonnage zones, by the use of radiation pyrometers say, since this permits all of the constraints to be computed simultaneously. The alternative procedure, in the absence of such temperature measurements, is to carry out computations sequentially to determine appropriate zone temperatures for different stock sizes within a given range and to store the computation results for interrogation at appropriate times so that zone temperature can be changed, as necessary, when slabs move from one zone to another: this will, of course, require considerable storage facilities in the computer and a complex slab-tracking programme.

In any event, it is useful to consider one example of a suitable mathematical model for use in accordance with the invention and this is as follows:

$$X_1 = \frac{U_1}{1 + \frac{\alpha_1 v}{Y_1}} \geq T_1 \quad (1)$$

$$X_2 = \frac{U_2 + X_1\left(\frac{\alpha_2 v}{Y_2}\right)}{1 + \frac{\alpha_2 v}{Y_2}} \geq T_2 \quad (2)$$

$$X_3 = \frac{U_3 + X_2\left(\frac{\alpha_3 v}{Y_2}\right)}{1 + \frac{\alpha_3 v}{Y_3}} \geq T_3 \quad (3)$$

$$m = \frac{1}{\eta}\left[\frac{C_1 G_1 U_1}{1 + \frac{\alpha_1 v}{Y_1}} + \frac{C_2 G_2 (U_2 - X_1)}{1 + \frac{\alpha_2 v}{Y_2}} + \frac{C_3 G_3 (U_3 - X_2)}{1 + \frac{\alpha_3 v}{Y_3}}\right] \quad (4)$$

where:

$U_1$, $U_2$ and $U_3$ are the control parameters for the preheat, tonnage and soaking zones respectively, $X_1$, $X_2$ and $X_3$ represent the slab exit temperatures from the preheat, tonnage and soaking zones respectively, $Y_1$, $Y_2$ and $Y_3$ are the respective lengths of the preheat, tonnage and soaking zones, $T_1$, $T_2$ and $T_3$ are respective minimum values for such temperatures determined by experience, such as 600° C., 1100° C., 1250° C.;

$\alpha_1$, $\alpha_2$ and $\alpha_3$ are the zone time-constants and are equal to $Z_1 \rho C_1/a_1, Z_2 \rho C_2/a_2, Z_3 \rho C_3/a_3$ respectively.

$Z_1$, $Z_2$ and $Z_3$ represent the thickness of the slab to be heated and are taken as the mean values within each zone, $\rho$ is the slab material density, $C_1$, $C_2$ and $C_3$ are the respective specific heats of the zones, $a_1$, $a_2$ and $a_3$ are respective heat transfer coefficients derived empirically for the zones, $v$ is the velocity of slab movement through the furnace, M is the overall fuel consumption rate in units of heat, $G_1$, $G_2$ and $G_3$ are the respective tonnage rates in the zones, and $\eta$ is the furnace efficiency, assumed to vary with the tonnage rates $G_1$, $G_2$ and $G_3$.

In minimising expression (4), it should be noted that it is only necessary to solve for equality to zero of the partial differential coefficients $\partial M/\partial U_1$, $\partial M/\partial U_2$ and $\partial M/\partial U_3$ of M with respect to the control parameters $U_1$, $U_2$, $U_3$ within the constraints represented by the expressions (1), (2) and (3), so that the exact form of furnace efficiency $\eta$ is not critical since it is assumed constant. However, suitable values can be derived empirically for different tonnage rates in the successive zones, or a weighted sum expression can be derived, as is the case for the remainder of expression (4).

Figure 3:
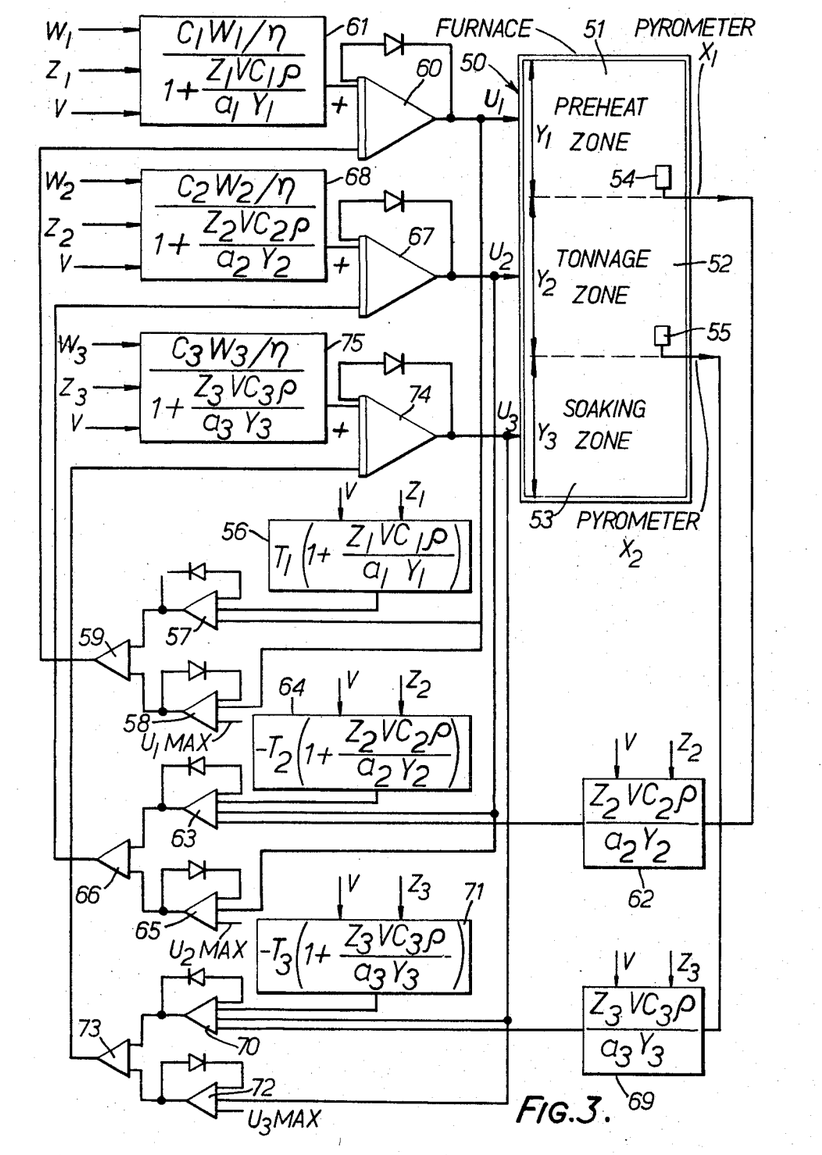
FIG. 3 illustrates in schematic form one embodiment of a computer suitable for operation in accordance with FIG. 2.

FIG. 3 illustrates one embodiment of an analogue-digital computer for operation in accordance with the above mathematical model. The rectangular blocks are digital arithmetic units and the triangular blocks are analogue operational amplifier units. It will be seen that the necessary conversions of data representations are only digital-to-analogue, this being simpler than the reverse conversion.

As mentioned above, the minimisation of expression (4) is by use of partial derivatives, these being integrated with respect to time. In addition the minimum and maximum constraints use measured values of $X_1$, $X_2$ in connection with expressions (2) and (3), while expression (1) assumes that the slab temperature is zero on entry to the furnace.

For simplicity, FIG. 3 does not take account of the temperature gradient constraints indicated by way of the sloping boundary lines in FIG. 1. However, these are readily catered for since they only involve simple arithmetical relationships between the control parameters $U_1$, $U_2$ and $U_3$.

FIG. 3 shows diagrammatically a continuous re-heat furnace 50 having pre-heat, tonnage and soaking zones 51, 52 and 53 with respective lengths of $Y_1$, $Y_2$ and $Y_3$. The roof temperature of pre-heat zone 51 is set by conventional control means at a temperature determined by a control potential $U_1$, while the roof temperatures of the tonnage and soaking zones are similarly controlled at temperatures determined by potentials $U_2$ and $U_3$.

The temperature of the slabs leaving the pre-heat zone 51 for the tonnage zone 52 is measured by a pyrometer 54 providing, by way of conventional associated circuitry (not shown) a signal $X_1$ denoting the slab temperature at this point. Similarly, the temperature of the slabs leaving tonnage zone 52 for soaking zone 53 is measured by a pyrometer 55 providing a temperature-denotive signal $X_2$.

Other signals derived by conventional measuring means are a signal V representing the speed of advance of the slabs through the oven, signals $G_1$, $G_2$ and $G_3$ representing the tonnage rates in the three zones 51, 52 and 53 respectively, and signals $Z_1$, $Z_2$ and $Z_3$ representing the mean slab thickness in the three zones 51, 52 and 53 respectively.

An arithmetic unit 56 which is fed with signals V and $Z_1$, has a pre-set control which is used to give a predetermined value $T_1$ to the minimum temperature of the slabs leaving preheat zone 51. This unit is arranged to yield an analogue output signal representing the function:

$$-T_1\left(1+\frac{Z_1VC_1\rho}{a_1Y_1}\right)=-T_1\left(1+\frac{\alpha_1V}{Y_1}\right)$$

This function signal is subtracted in an operational amplifier 57 from the preheat zone temperature control signal $U_1$, to yield a first constraint signal representing the function:

$$U_1-T_1\left(1+\frac{Z_1VC_1\rho}{a_1Y_1}\right)=U_1-T_1\left(1+\frac{\alpha_1V}{Y_1}\right)$$

This first constraint signal represents the constraint of expression (1).

Another operational amplifier 58 is fed with signal $U_1$ and with a constant potential $U_1$ max representing the maximum allowable roof temperature in the preheat zone, and thus yields a second constraint signal representing the allowable increase in preheat zone roof temperature. This signal and the first constraint signal from amplifier 57 are combined in an inverting amplifier 59.

The signal thus derived is applied to an integrating amplifier 60, in which it is employed to establish limits to the range within which the amplifier will respond to with the output signal from an arithmetic unit 61. Unit 61 is fed with digital input signals $W_1$, $Z_1$ and V, and yields an analogue output signal representing the partial differential coefficient $\partial M/\partial U_1$ as being equal to:

$$\frac{1}{\eta}\cdot\frac{C_1W_1}{1+\frac{Z_1VC_1\rho}{a_1Y_1}}=\frac{1}{\eta}\cdot\frac{C_1W_1}{1+\frac{\alpha_1V}{Y_1}}$$

which signal is then integrated in amplifier 60 the signal $U_1$ representing the desired roof temperature in the preheat zone.

The signal $X_1$ representing the slab exit temperature of preheat zone 51 is fed to an arithmetic unit 62 to which are also fed signals V and $Z_2$. Unit 62 yields an analogue output signal representing the function:

$$X_1\frac{Z_2VC_2\rho}{a_2Y_2}=\frac{\alpha_2V}{Y_2}$$

This signal is fed to an operational amplifier 63 in which it is combined with tonnage zone roof temperature control signal $U_2$ and with the output from an arithmetic unit 64 which is fed with signals V and $Z_2$ and has a preset control determining the minimum temperature $T_2$ of slabs leaving the tonnage zone. Unit 64 yields an analogue signal representing the function:

$$-T_2\left(1+\frac{Z_2VC_2\rho}{a_2Y_2}\right)=-T_2\left(1+\frac{\alpha_2V}{Y_2}\right)$$

Operational amplifier 63 thus yields a third constraint signal representing the function:

$$U_2+X_1\left(\frac{Z_2VC_2\rho}{a_2Y_2}\right)-T_2\left(1+\frac{Z_2VC_2\rho}{a_2Y_2}\right)$$

or $$U_2+X_1\left(\frac{\alpha_2V}{Y_2}\right)-T_2\left(1+\frac{\alpha_2V}{Y_2}\right)$$

This third constraint signal represents the constraint of expression (2).

Another operational amplifier 65 is fed with signal $U_2$ and with a constant potential $U_{2\,max}$ representing the maximum allowable roof temperature in the tonnage zone. The difference signal thus derived, which represents a fourth constraint, is combined with the output from amplifier 63 in an inverting amplifier 66. The combined constraint signal thus derived another integrating operational amplifier 67, in which it is used to establish limits to the range within which the amplifier will respond to the output signal from an arithmetic unit 68, which is fed with digital input signals $W_2$, $Z_2$ and V and which yields an analogue output signal representing the partial differential coefficient $\partial M/\partial U_2$ as being equal to:

$$\frac{1}{\eta}\cdot\frac{C_2W_2}{1+\frac{Z_2VC_2\rho}{a_2Y_2}}=\frac{1}{\eta}\cdot\frac{C_2W_2}{1+\frac{\alpha_2V}{Y_2}}$$

which signal is then integrated in an integrating amplifier 67.

Amplifier 67 thus yields the signal $U_2$ representing the required roof temperature in the tonnage zone.

The signal $X_2$ representing the slab exit temperature of tonnage zone 52 is fed to an arithmetic unit 69 to which are also fed signals V and $Z_3$. Unit 69 yields an analogue output signal representing the function:

$$X_2\frac{Z_3VC_3\rho}{a_3Y_3}=X_2\frac{\alpha_3V}{Y_3}$$

In an operational amplifier 70, this signal is combined with the analogue output signal from an arithmetic unit 71, which is fed with signals V and $Z_3$ and has a preset control determining the minimum temperature $T_3$ of slabs leaving the furnace. Unit 71 yields an analogue output signal representing the function:

$$-T_3\left(1+\frac{Z_3VC_3\rho}{a_3Y_3}\right)=-T_3\left(1+\frac{\alpha_3V}{Y_3}\right)$$

Amplifier 70 is also fed with the signal $U_3$ representing the roof temperature in the soaking zone, and thus yields a fifth constraint signal representing the function:

$$U_3+X_2\frac{Z_3VC_3\rho}{a_3Y_3}-T_3\left(1+\frac{Z_3VC_3\rho}{a_3Y_3}\right)$$

or $$U_3+X_2\frac{\alpha_3V}{Y_3}-T_3\left(1+\frac{\alpha_3V}{Y_3}\right)$$

This fifth constraint signal therefore represents the constraint of expression (3). Another operational amplifier 72 is fed with soaking zone roof temperature control signal $U_3$ and with a constant potential $U_{3\,max}$ representing the maximum allowable roof temperature in the soaking zone. The output signal from amplifier 72, representing a sixth constraint, is computed as the difference between the actual and allowable roof temperatures, must not be negative. This signal is fed to an amplifier 73 which applies either this signal or the constraint signal from amplifier 70 to another integrating amplifier 74, in which they are employed to establish limits to the range within which the amplifier will respond to the output signal from a further arithmetic unit 75. Unit 75 receives digital input signals $W_3$, $Z_3$ and V and derives from them an analogue output signal representing the partial differential coefficient $\partial M/\partial U_1$ as being equal to:

$$\frac{1}{\eta}\cdot\frac{C_3G_3}{1+\frac{Z_3VC_3\rho}{a_3Y_3}}=\frac{1}{\eta}\cdot\frac{C_3G_3}{1+\frac{\alpha_3V}{Y_3}}$$

which signal is integrated in amplifier 74, the output from which thus represents the desired roof temperature $U_3$ of the soaking zone.

This arrangement simultaneously solves three partial differential equations representing the relation between fuel consumption and the individual furnace zone temperatures for minimum fuel consumption within the constraints imposed by the predetermined minimum slab temperatures at the zone exits and the maximum allowable furnace roof temperature.

In an alternative mode of operation in accordance with the invention the variables $U_1$, $U_2$ and $U_3$ are maintained in a steady state by employing the slab velocity as another manipulated variable to minimise the specific fuel consumption, that is the fuel consumption per ton of throughput. This method is especially valuable when no serious disturbances in mill operation arise, so that a high tonnage rate can be achieved.

In point of fact the velocity itself is not a convenient quantity to control, owing to the mode of furnace operation. Rather, the pushing rate, or interval between slab movements is controlled.

Figure 4:
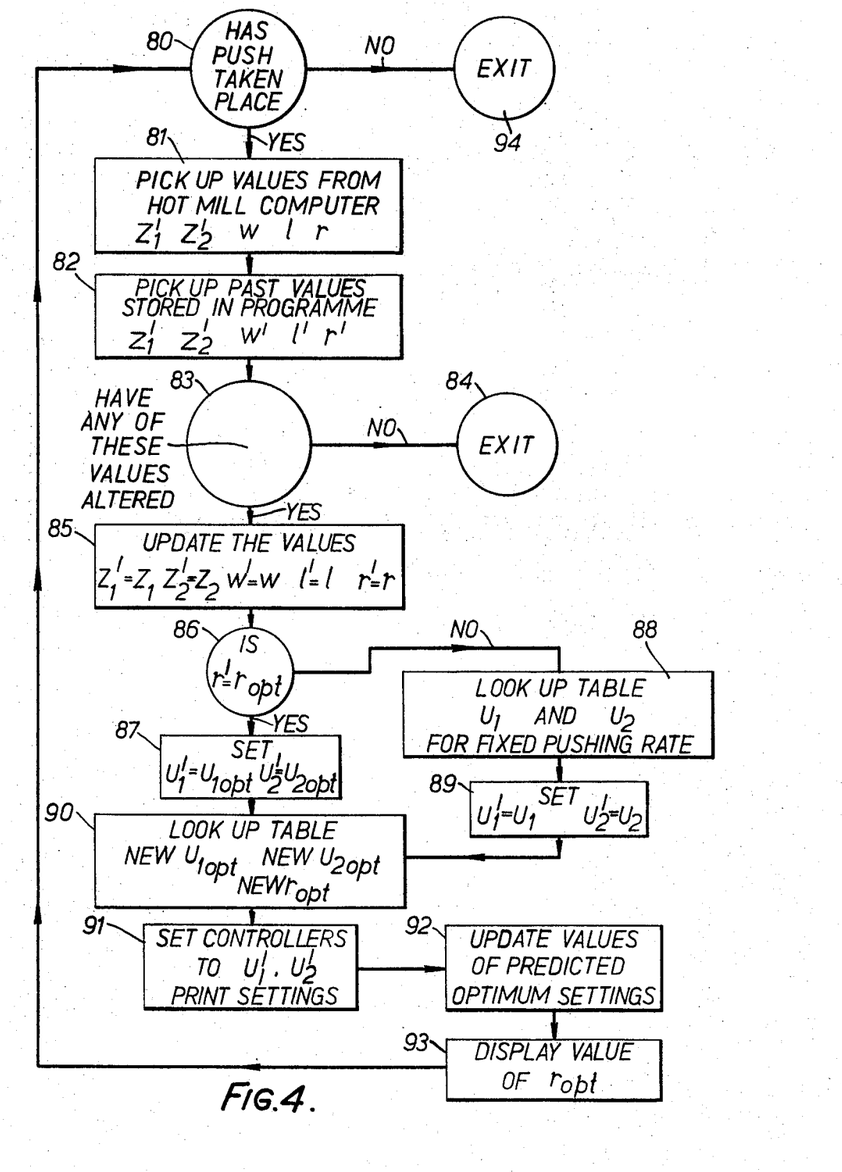
FIG. 4 is a flow diagram representing an alternative form of computation.

The digital computer programme necessary for this mode of operation as applied, for simplicity in description to a two-zone furnace, is shown in FIG. 4. Initiation of each computing programme is occasioned by the completion of a pushing cycle; when a cycle is complete as at step 80, when the answer to the question—"Has push taken place" is "Yes," then the programme advances to the next step 81 in which new values for the disturbance variables are derived from the computer controlling the operation of the associated hot mill. The variables required are the slab thicknesses $Z_1$, $Z_2$ in the respective furnace zones, the mean slab width W, the slab length $l$ and the pushing rate $r$ (expressed in seconds since last push). In step 82 the corresponding values $Z_1'$, $Z_2'$, $W'$, $l'$ and $r'$ obtained in the preceding programme cycle are read out from the programme store, and in step 83 the two sets of values are compared. If there has been no change the programme is terminated as indicated by instruction 84. If a change in the values has occurred, then the next instruction 85 is to update the stored value to those newly obtained. When this has been done, it is determined, in accordance with instruction 86, whether the actual pushing rate $r'$ is equal to the optimum pushing rate as previously determined. If "Yes," then in accordance with instruction 87 the furnace zone temperatures $U_1'$ and $U_2'$ are set to the respective optimum values $U_{1\,opt}$ and $U_{2\,opt}$.

If, however, the actual value of pushing rate is not the optimum, then in accordance with instruction 88, the values of $U_1$ and $U_2$ for the actual pushing rate are determined from a table and then, in accordance with instruction 89, the actual values of zone temperature are set to the new values $U_1'$ and $U_2'$ thus determined.

Following the completion of instruction 87 or 89 in accordance with instruction 90, the values of $U_1'$ and $U_2'$ are looked up in a table from which the new value of $r_{opt}$ is determined. The furnace temperature controllers are then adjusted, in accordance with instruction 91, to the new values of required temperature and these values are printed for record. In accordance with instruction 91 the new predicted optimum values $U_{1\,opt}$, $U_{2\,opt}$ and $r_{opt}$ are then inserted in the relevant stores in place of the existing values of these quantities and in accordance with instruction 93 the new value of $r_{opt}$ is displayed to the operator controlling the pushing operation.

Until the operator acts upon the instruction no push will occur, and the next programme cycle will not be initiated, as indicated by instruction 94. The operator may initiate the next push after any other interval $r$ (not equal $r_{opt}$) in which case the computation proceeds in accordance with instruction 88 as described earlier.

Figure 5:
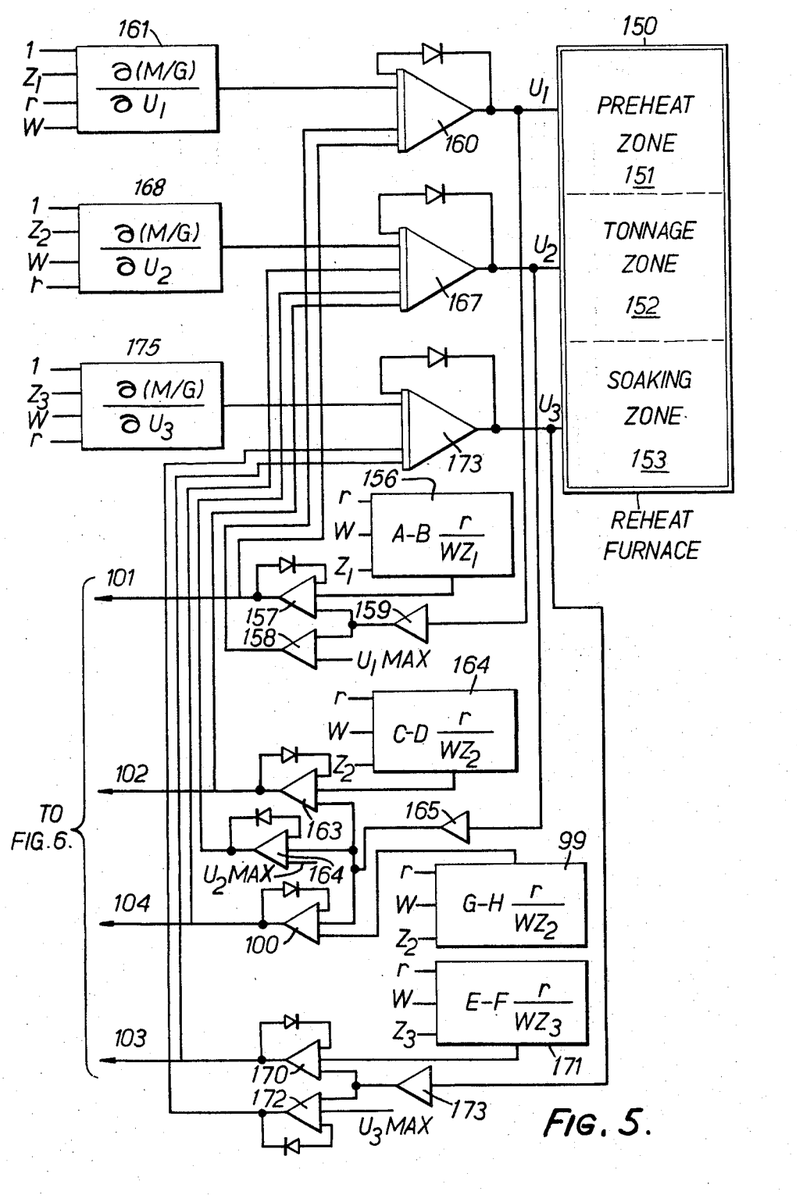
FIGS. 5 and 6 illustrate schematically another form of computer for operation in accordance with FIG. 4.
Figure 6:
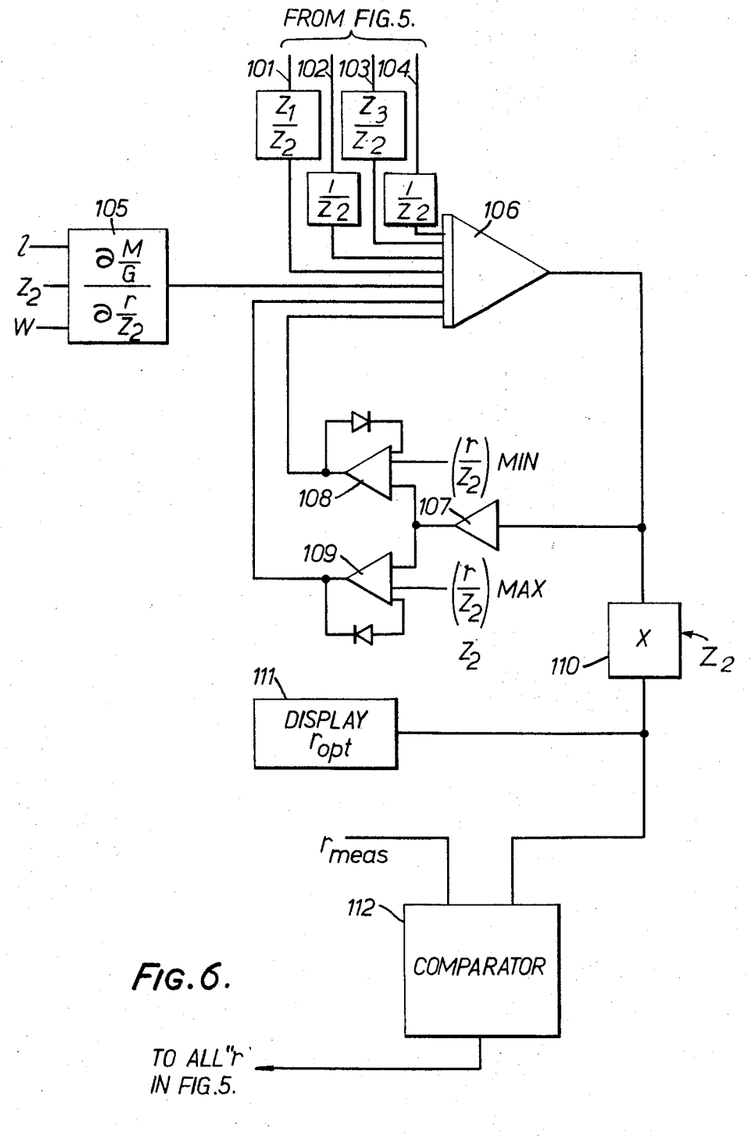

FIGS. 5 and 6 show the operating diagram of an analogue computation system capable of performing the computations necessary for carrying out the modified method. The arrangement is basically similar to that described above in relation to FIG. 3.

The signals $U_1$, $U_2$, $U_3$ representing the temperatures of the preheat, tonnage and soaking zones 151, 152, 153 respectively of reheat furnace 150 are applied by way of respective inverting amplifiers 159, 165 and 173 to operational amplifiers 157, 163, 170 and 100, in which the inverted signal is combined with the signals derived from respective or arithmetic units 156, 164, 171 and 99 in which there are computed factors determining the lower restraints on the zone temperatures. Specifically, the computations performed in these arithmetic units are as follows:

Unit 156 develops a signal representing the value of the expression $$A - B\frac{r}{WZ_1}$$

where A is a reference temperature for the preheat zone and B is a factor representing the rate of change of zone temperature with rate of advance of material through the zone. In a practical furnace the value of A may be 1610° C. and the value of B may be $$3140°\,C. \times \frac{\text{centimetres}^2}{\text{second}}$$

Unit 164 develops a signal representing the value of the expression $$C - D\frac{r}{WZ_2}$$

where C is a first reference temperature for the tonnage zone and D is a first factor representing the rate of change of zone temperature with rate of advance of material through the zone. In a practical furnace the value of C may be 1640° C. and the value of D may be $$2100°\,C. \times \frac{\text{centimetres}^2}{\text{second}}$$

Unit 99 develops a signal representing the value of the expression $$G - H\frac{r}{WZ_3}$$

where G is a reference temperature for the zone and H is a factor representing the rate of change of soaking zone temperature with rate of advance of material in the zone. In a practical furnace G may have a value of 1410° C. and H may have a value of $$770°\,C. \times \frac{\text{centimetres}^2}{\text{second}}$$

Unit 171 develops a signal representing the value of the expression $$E - F\frac{r}{WZ_2}$$

where E is a second reference temperature for the tonnage zone and F is a factor representing the rate of change of zone temperature with rate of advance of material in the zone. In a practical furnace E may have a value of 1560° C. and F may have a value of $$1820°\,C. \times \frac{\text{centimetres}^2}{\text{second}}$$

In addition the signals $-U_1$, $-U_2$ and $-U_3$ from inverting amplifiers 159, 165 and 173 are applied respectively to operational amplifiers 158, 164 and 172 in which they are combined with fixed potentials representing the maximum allowable furnace zone roof temperatures and the restraint signals thus developed are fed together with those from operational amplifiers 157, 163, 170 and 100 to the appropriate ones of the three integrating operational amplifiers 160, 167 and 174 which receive respective partial differential coefficients computed by arithmetic units 161, 168 and 175. Arithmetic units 161, 168 and 175 are each fed with signals representing the means thickness $Z_z$ of the material in a furnace zone, the distance P through which the material is moved at an average interval of $r$ seconds and the width $L_z$ of the material in the zone, and computes from these signals and from predetermined voltages representing the density $\rho$ of the material, the specific $C_z$ of material in the zone, the mean temperature $X_z$ of material leaving the zone, a differential coefficient $\partial H_L/\partial U_z$ representing the rate of variation of heat $H_L$ dissipated in the furnace chamber with change of zone temperature $U_z$ and a heat transfer coefficient $\phi$ characteristic of the furnace, analogue signals each of which represents the value of the partial differential coefficient $\partial(M/G)/\partial U_z$ for each zone as equal to the expression:

$$\frac{\partial(M/G)}{\partial U_a}$$

$$\frac{1}{\phi}\left(c_z\frac{\partial X_z}{\partial U_z}+\frac{r}{Z_zPL_{2}\rho}\frac{\partial H_L}{\partial U_z}\right)$$

for one zone of the furnace. The partial differential signal for the preheat zone thus derived in arithmetic unit 161 is integrated in an integrating amplifier 160 within the restraints provided by other analogue signals from amplifiers 157 and 158 representing the values of $$-U_1+\left(A-B\frac{r}{WZ_1}\right)$$

and $U_{1\,max}-U_1)$. The partial differential signal derived for the tonnage zone is integrated in an integrating amplifier 167 within the restraints provided by other analogue signals from amplifiers 163 and 164, representing respectively the values of $$-U_2+\left(C-D\frac{r}{WZ_2}\right)$$

and $(U_{2\,max}-U_2)$. The partial differential signal for the soaking zone derived in arithmetic unit 175 is integrated in an integrating amplifier 176 within the restraints provided by other analogue signals from amplifiers 170 and 172 representing respectively the values of the expressions $$-U_3+\left(E-F\frac{r}{WZ_3}\right)$$

and $(U_{3\,max}-U_3)$ and develop the three zone temperature control signals $U_1$, $U_2$ and $U_3$.

In addition, the signals from operational amplifiers 157, 163, 170 and 100 are fed out over respective leads 101, 102, 103 and 104 to the arrangement shown in FIG. 6. differential coefficient In FIG. 6 is shown an arithmetic unit 105 which is fed with signal representing the values of 1, $Z_2$ and W and which derives from these values and from respective preset voltages representing the values $C_1$, $C_2$ and $C_3$ of the specific heat of material in the three zones, the values $X_1$, $X_2$, $X_3$ of the mean temperatures of the slabs at the exits from the zones, the values $H_L$ of the heat dissipated in the furnace, the value $Z_z$ of the weighted mean thickness of slabs in the furnace, the value $L_z$ of the length of slabs in the furnace, the value N of the mean width of six slabs discharged and the value $\rho$ of the density of the material, which are provided by preset controls (not shown) within unit 105, a signal representing the value of the partial $$\frac{\partial M/G}{\partial r/Z_2}$$

$M/G = \dfrac{\text{furnace heat output}}{\text{tonnage rate}} = $ specific fuel consumption This signal is computed from the equation:

$$\frac{\partial(M/G)}{\partial(r/Z_2)}=\frac{1}{\phi}\left(C_1\frac{\partial X_1}{\partial r}+C_2\frac{\partial X_2}{\partial r}+C_3\frac{\partial X_3}{\partial r}+\frac{\partial H_L}{\partial ZL_2N\rho}\right)$$

an integrating operational amplifier 106, in which it is combined with signals received by way of leads 101–104 from FIG. 5 and multiplied in multipliers 120, 121, 122 and 123 by respective factors of $Z_1/Z_2$, $1/Z_2$, $1/Z_2$ and $Z_3/Z_n$. Amplifier 106 is thus caused to develop an output signal representing $r/Z_2$. This output signal is inverted in an amplifier 107 and the inverted signal is applied to operational amplifiers 108, 109 in which it is combined respectively with fixed potentials representing the minimum and maximum allowable values of $(r/Z_2)$. The restraint signals thus obtained are applied to the input of operational amplifier 106 to apply appropriate limits to the output signal.

The output signal from amplifier 106 is also applied to a multiplier 110 in which it is multiplied by a signal representing the value of $Z_z$ to derive an output signal representing the computed value of $r_{opt}$. This signal is applied to a display device 111 of appropriate known type to show to the pusher operator the desired interval between successive pushes.

The signal is also applied to a comparator 112, in which it is compared with the actual value of pushing rate $r_{meas}$ as determined by actual measurement. When the computed and measured values of $r$ coincide within a specified tolerance, the computed value is applied to the $r$ inputs of all the arithmetic units 99, 156, 161, 167, 168, 171, 175 in FIG. 5. When the computed and measured values of $r$ are different, then the measured value of $r$ is applied to the arithmetic units. Under the former conditions, when $r_{meas}=r_{opt}$, the system operates to provide the optimum value of pushing rate for minimum specific fuel consumption (therms/ton). When the measured and computed values differ, as in response to some operating check in the rolling process, then the system operates to adjust the furnace zone temperatures to provide the minimum specific fuel consumption at the actual pushing rates.

I claim:
1. The method of controlling the operation of a plural-zone continuous heating furnace which comprises the steps of:
   determining the dimensions of material to be heated passing through each said zone in a predetermined time interval;
   determining empirically a heat transfer coefficient for each said zone;
   computing in respect of each said zone the minimum temperature required to ensure that the temperature of said material leaving said zone exceeds a predetermined minimum value;
   computing the values of the partial differential coefficients representing the rate of variation of furnace fuel consumption with change of temperature in each said furnace zone with material moving through said zone at the measured rate;
   determining maximum allowable furnace zone temperatures;
   and adjusting the furnace zone temperatures to minimize the sum of said partial differential coefficients within constraints imposed by said computed minimum zone temperatures and said predetermined maximum zone temperatures.

2. The method according to claim 1 wherein each said partial differential coefficient represents the rate of variation of specific fuel consumption with temperature in an individual one of said zones.

3. The method in accordance with claim 2 which includes the additional steps of:
   computing each of a plurality of partial differential coefficients each representing the rate of change of temperature in an individual one of said furnace zones with rate of material movement;
   computing the value of the term representing the total furnace heat divided by the mass of material contained in the furnace;
   computing the integral of the sum of all said partial differential coefficients with said term;
   determining the value of a factor representing the furnace thermal efficiency;
   dividing said integral by said factor to develop a computed optimum rate of movement of said material;
   displaying an indication of said optimum movement rate to an operator controlling said rate;
   comparing the actual rate of material movement with the computed rate of movement;
   computing the individual temperatures of said furnace zones yielding minimum specific fuel consumption for the actual rate of material movement;

and adjusting said zone temperatures to said computed values.

4. The method as claimed in claim 1 wherein the partial differential coefficient for each said zone is computed as:

$$\frac{\partial (M/G)}{\partial U_z} = \frac{1}{\phi}\left[ C_2 \frac{\partial X_z}{\partial U_z} + \frac{r}{Z_z l_z P \rho} \frac{\partial H_L}{\partial U_z} \right]$$

where $M/G$ is the specific fuel consumption of the furnace, $U_z$ is the zone temperature, $\phi$ is a heat utilization coefficient representing the furnace efficiency, $C_z$ is the specific heat of material in the zone, $X_z$ is the temperature of material leaving the zone, $r$ is the time interval between movements of the material through a distance P, $Z_z$ is the thickness of material in the zone, $l_z$ is the width of the material in the direction transverse to its direction of movement, $\rho$ is the density of the material and $H_L$ is the heat dissipated in the furnace chamber.

5. The method as claimed in claim 1, wherein each said partial differential coefficient represents the rate of variation of total furnace fuel consumption with temperature in an individual one of said zones.

6. Furnace control apparatus comprising in combination: a plural-zone continuous heating furnace, measuring means developing electric signals representative of the dimensions of material to be heated passing through each zone of said furnace in a predetermined interval of time;
means for developing further signals representative of the predetermined values of material density, of material specific heat in said furnace zones and of a furnace heat transfer coefficient;
computer means computing from applied signals the minimum furnace temperature required in each said zone to ensure that material leaving said zone has not less than a required minimum temperature;
further computer means computing from applied signals the values of each of a plurality of partial differential coefficients representing the rate of variation of furnace fuel consumption with change of temperature in an individual one of said furnace zones;
additional computer means computing from applied signals the individual furnace zone temperatures required to minimize the sum of said partial differential coefficients within constraints imposed by the minimum zone temperatures computed by first said computer means, and by predetermined maximum allowable zone temperatures, said additional computer means developing individual temperature control signals each representing the value of a said zone temperature;
means applying said electric signals as input signals to said computer means, said further computer means and said additional computer means;
temperature control means operating to control the temperature of each said furnace zone to a value determined by an applied temperature control signal;
and means applying each of said computer temperature control signals to control the temperature of the appropriate one of said furnace zones.

7. The apparatus as claimed in claim 6, wherein said electric signals applied to said further computer means comprise individual electric signals representing respectively the values of the mean thickness $Z_z$ of material in each said zone, of a distance P through which said material in said furnace is intermittently advanced, of the average time interval $r$ between successive advances of said material, of the width $L_1, L_2, L_3$ of said material in successive said zones of the density $\rho$ of the material, of the specific heat $C_1, C_2, C_3$ of material in successive said zones, of the mean temperature $X_1, X_2, X_3$ of material leaving successive said zones, of each of a plurality of partial differential coefficients.

$$\frac{\partial H_L}{\partial U_1}, \frac{\partial H_L}{\partial U_2}, \frac{\partial H_L}{\partial U_3}$$

representing the rate of variation of the heat $H_L$ dissipated in the furnace chamber with change of temperature, in each said zone, of the width L of said material transverse to its direction of advance, and of a heat utilization coefficient $\phi$ characteristic of the furnace thermal efficiency and wherein said further computer means operates to develop from said signals first, second and third derived signals representative respectively of the value of the expressions:

$$\frac{1}{\phi}\left( C_1 \frac{\partial X_1}{\partial U_1} + \frac{r}{Z_1 P L_1 \rho} \frac{\partial H_L}{\partial U_1} \right), \frac{1}{\phi}\left( C_2 \frac{\partial X_2}{\partial U_2} + \frac{r}{Z_2 P L_2 \rho} \frac{\partial H_L}{\partial U_2} \right)$$

and $$\frac{1}{\phi}\left( C_3 \frac{\partial X_3}{\partial U_3} + \frac{r}{Z_3 B L_3 \rho} \frac{\partial H_L}{\partial U_2} \right)$$

8. The apparatus as claimed in claim 7, wherein the means for adjusting the temperature of a first zone of said furnace includes computer means developing a signal representative of the required value $U_1$ for the furnace temperature in said zone, said computer means comprising:
means for developing further input signals representing respectively the values of a predetermined reference temperature A for said zone, of a predetermined factor B representing the rate of change of zone temperature with rate of material advance, of the value $U_{1\ max}$ of a predetermined maximum allowable furnace temperature in said zone,
first arithmetic means operating to develop from applied signals representing the values $U_1$, A, B, $r$, P and $Z_1$ a first restraint signal representing the value of the expression $$-U_1 + A - B\frac{r}{PZ_1}$$

second arithmetic means operating to develop from applied signals representing the values of $U_{1\ max}$ and $U_1$ a second restraint signal representing the value of the expression $U_{1\ max} - U_1$;
means applying said input signals to each said arithmetic means;
first integrator means;
means applying to said first integrator means said first restraint signal, said second function signal and said first derived signal whereby said first integrator means develops a first output signal representative of the value $U_1$ within the limits imposed by said restraints;
temperature control means operating to control the temperature of said furnace zone to a value determined by an applied temperature control signal;
and means applying said first output signal to said temperature control means as said temperature control signal.

9. The apparatus as claimed in claim 8, wherein the means for adjusting the temperature of an intermediate zone of said furnace includes computer means developing a signal representative of the required value $U_2$ for the furnace temperature in said zone, said computer means comprising:
means for developing further input signals representing respectively the values of a first predetermined reference temperature C for said zone, a first predetermined factor D representing the rate of change of zone temperature with rate of material advance, a second predetermined reference temperature G for said zone, a second predetermined factor H representing the rate of change of zone temperature with rate of material advance and of a predetermined maximum allowable furnace temperature $U_{2\ max}$ in said zone,
third arithmetic means operating to develop from applied signals representing the values $U_2$, C, D, $r$, P and $Z_2$ a third restraint signal representing the value of the expression $$-U_2+C-D\frac{r}{PZ_2}$$

fourth arithmetic means operating to develop from applied signals representing the values $U_2$, G, H, $r$, P and $Z_2$ a fourth restraint signal representative of the value of the expression $$-U_2+G-H\frac{r}{PZ_2}$$

fifth arithmetic means operating to develop from applied signals representing the values $U_{2\ max}$ and $U_2$ a fifth restraint signal representative of the value of the expression $U_{2\ max}-U_2$;

means applying said input signals to each said arithmetic means;

second integrator means;

means applying to said second integrator means said third, fourth and fifth restraint signals and said second derive signal, whereby said integrator means develops a second output signal representative of the value $U_2$ within the limits imposed by said restraints;

temperature control means operating to control the temperature of said zone to a value determined by an applied temperature control signal;

and means applying said second output signal to said temperature control means as said temperature control signal.

10. The apparatus as claimed in claim 9 wherein the means for adjusting the temperature of that zone of said furnace from which the material leaves the furnace includes computer means developing a signal representative of the required value $U_3$ for the furnace temperature in said zone, said computer means comprising:

means for developing further input signals representing respectively the values of a predetermined reference temperature E for said zone, of a predetermined factor F representing the rate of change of zone temperature with rate of material advance, of the value $U_{3\ max}$ of a predetermined maximum allowable furnace temperature in said zone, sixth arithmetic means operating to develop from applied signals representing the values $U_3$, E, F, $r$, P and $Z_3$ a sixth signal representing the value of the expression $$-U_3+E-F\frac{r}{PZ_3}$$

integrator means;

seventh arithmetic means operating to develop from applied signals representing the values $U_{3\ max}$ and $U_3$ a seventh signal representing the value of the expression $$U_{3\ max}-U_3$$

means applying said input signals to each said arithmetic means;

third integrator means;

means applying to said third integrator means said sixth function signal, said seventh function signal and said third derived signal, whereby said integrator means develops a third output signal representative of the value $U_3$ of the required furnace temperature in said zone;

temperature control means operating to control the temperature of said furnace zone to a value determined by an applied temperature control signal;

and means applying said third output signal to said temperature control means as said temperature control signal.

11. The apparatus in accrodance with claim 10 wherein said zone reference temperatures A, C, E and G and said first, second, third and fourth factors B, D, F, and H have the following values respectively:

$$\begin{array}{l}A=1610\\C=1640\\E=1560\\G=1410\end{array}\Big\} \text{degrees Celsius}$$

$$\begin{array}{l}B=3140\\D=2100\\F=1820\\G=770\end{array}\Big\} \frac{\text{degrees Celsius} \times \text{centimetres}^2}{\text{second}}$$

12. The apparatus in accordance with claim 10, and including also eighth arithmetic means operating to develop from applied signals representing the values $\phi$, $C_1$, $C_2$, $C_3$, $X_1$, $X_2$, $X_3$, $r$, $H_L$, Z, L, P and $\rho$ an eighth function signal representing the value of the expression $$\frac{1}{\phi}\left[C_1\frac{\partial X_1}{\partial r}+C_2\frac{\partial X_2}{\partial r}+C_3\frac{\partial X_3}{\partial r}+\frac{H_L}{ZLP\rho}\right]$$

means applying said input signals to said eighth arithmetic means;

fourth integrator means;

means for applying said first function signal, said third function signal, said fourth function signal, said sixth function signal and said eighth function signal to said fourth integrator means, whereby said fourth integrator means develops a fourth output signal representative of the value of the expression $\bar{r}/Z_2$, where $\bar{r}$ represents the required interval between material advances;

signal multiplying means;

means applying to said signal multiplying means said fourth output signal and said input signal representing the value $Z_2$, whereby said multiplying means yields an output signal representing the value of the quantity $\bar{r}$;

electric signal controlled display means positioned to be visible to an operator controlling said material advances;

and means applying said output signal to said display means to display to said operator the value of said required interval.

13. The apparatus as claimed in claim 11 and including also means for developing an electric signal representative of the mean value $r'$ of the time intervals between successive advances of said material;

comparator means operating when a first and a second applied signal represent like quantities to yield a comparator output signal representing the first of said signals and when said applied signals are unlike to yield an input signal representing the second of said applied signals;

means applying said electric signal representative of the value $r'$ to said comparator means as said first electric signal;

means applying said electric input signal representing the required time interval $\bar{r}$ between successive advances of said material to said comparator means as said second applied signal;

and means applying said comparator output signal to said first, third, fourth and sixth arithmetic means as said input signal representing the interval between successive material movements.

14. The apparatus as claimed in claim 6, wherein said computer means for adjusting the temperature $U_1$ of that zone into which said material first enters comprises:

a plurality of signal generating means developing respectively input signals representing the values of the tonnage rate $G_1$ of material passing through said zone, the thickness $Z_1$ of material in said zone, the specific heat $C_1$ of material in said zone, the density $\rho$ of the material, the length $Y_1$ of the zone in the direction of material advance, the heat transfer coefficient $a_1$ for the zone and the furnace efficiency;

first arithmetic means for developing from applied signals a first function signal representing the value of the function $$\frac{1}{\eta} \frac{C_1 G_1}{1+\frac{Z_1 V C_1 \rho}{a_1 Y_1}}$$

means applying said input signals to said first arithmetic means;

first integrating means operating to integrate applied signals within the constraints $$T_1\left(1+\frac{Z_1 V C_1 \rho}{a_1 Y_1}\right) < U_1 < U_{1 \text{ max}}$$

where $T_1$ represents the required minimum temperature of material leaving said zone and $U_{1 \text{ max}}$ represents a predetermintd maximum allowable furnace temperature in said zone;

means applying said first function signal to said first integrating means, whereby said integrating means yields a first output signal representing the value of the required furnace temperature in said zone;

temperature control means operating to control the temperature of said furnace zone to a value determined by an applied temperature control signal;

and means applying said first output signal to said temperature control means as said temperature control signal.

15. The apparatus as claimed in claim 14, wherein said computer means for adjusting the temperature of a further furnace zone comprises:

a plurality of signal generator means developing respectively input signals representing the tonnage rate $G_z$ of said zone, the thickness $Z_z$ of material in said zone, the speed of movement $V$ of material through the furnace, the specific heat $C_z$ of material in said zone, the density $\rho$ of the material, the length $Y_z$ of said zone in the direction of material movement, the heat transfer coefficient $a_z$ of said zone, the furnace efficiency $\eta$, the temperature of material leaving said zone, the required minimum temperature $T_z$ of material leaving said zone, and a predetermined maximum allowable value $U_{z \text{ max}}$ for the furnace temperature in said zone, second arithmetic means deriving from applied signals a second function signal representing the value of the expression $$\frac{1}{\eta} \frac{C_z G_z}{1+\frac{Z_z V C_z \rho}{a_z Y_z}}$$

third arithmetic means deriving from applied signals a third function signal representing the value of the expression $$X_z\left(\frac{C_z G_z \rho}{a_z Y_z}\right) - T_z\left(1+\frac{\rho C_z G_z}{a_z Y_z}\right) - (U_{z \text{ max}} - U_z)$$

a second integrating means;

means applying said second and third function signals to said second integrating means, whereby said integrating means yields a second output signal representing the required value $U_z$ of the furnace temperature in said zone;

temperature control means operating to control the temperature of said furnace zone to a value determined by an applied temperature control signal;

and means applying said second output signal to said temperature control means as said temperature control signal.

References Cited

UNITED STATES PATENTS 3,252,693  5/1966  Nelson  235—151.1(X)
3,358,743  12/1967  Adams  164—154

OTHER REFERENCES

Automatic Control: "Data Control," pp. 43, 45, 46 and 47, May 1958. (235—151.1).

Control Engineering: "Controlling a Complete Hot Strip Mill," pp. 57–63, October 1963. (235—151.1).

EUGENE G. BOTZ, Primary Examiner

U.S. Cl. X.R.

266—5, 13